3,278,381
5 AMINO-1-PHENYLTETRAZOLE MUSCLE RELAXANT PREPARATIONS
Charles D. Bossinger, Kankakee, and Takashi Enkoji, Park Forest, Ill., assignors to Armour Pharmaceutical Company, Chicago, Ill., a corporation of Delaware
No Drawing. Filed Oct. 4, 1963, Ser. No. 313,741
7 Claims. (Cl. 167—65)

This invention relates to pharmaceutical preparations having muscle relaxant activity and which are especially suited for producing skeletal muscle relaxation.

It is well known that the spasm of skeletal muscle is painful and in a great majority of the cases the patient is considerably disabled. There has been a constant search for skeletal muscle relaxant preparations which would be effective in low doses and be relatively free of adverse side effects, particularly depression, drowsiness and other central nervous system depressant effects.

Accordingly, a principal object of the present invention is to provide new and useful pharmaceutical preparations having muscle relaxant activity which are especially suited for producing skeletal muscle relaxation in non-epileptic subjects.

Another object of the present invention is to provide new and useful pharmaceutical preparations which are effective in low dosages and are relatively free of adverse side effects particularly in the central nervous system.

Another object of the present invention is to provide new and useful pharmaceutical preparations which are effective to provide muscle relaxation over a prolonged period and are characterized by low-toxicity.

These and still further objects as shall hereinafter appear are fulfilled by the present invention to a remarkably unexpected extent as shall become apparent from a consideration of the following description of embodiments exemplifying the invention.

The invention is predicated upon our discovery of novel medicinal preparations which are unique in that they are potent, long acting muscle relaxants which when compared with generally known muscle relaxant preparations, have a totally unexpected reduced incidence of side effects. Furthermore, the preparations of the present invention permit the patient to become ambulatory much sooner by restoring normal muscular function without reducing muscle strength or reflex activity. The novel preparations of the present invention further demonstrate an unusual effectiveness in low dosages which demonstrate a long duration of action and possess an extremely low order of toxicity.

Most advantageously, the preparations of this invention are in a dosage unit form and comprise a non-toxic pharmaceutical carrier and 5 - amino - 1 - phenyltetrazole which has the following structural formula:

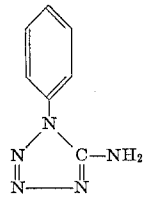

5-amino-1-phenyltetrazole can be prepared by treating phenylthiourea with methyl iodide in anhydrous ethanol at reflux. This yielded, after the solvent is removed by distillation and the residue crystallized and washed with anhydrous ether, 1-phenyl-S-methyl-isothiourea hydriodide. The 1-phenyl-S-methylisothiourea hydriodide is, in turn, treated with anhydrous hydrazine in ethanol to give, on heating, a vigorous evolution of methyl mercaptan and, after removing the solvent by distillation under vacuum, a heavy syrup, 1-phenyl-3-amino-guanidine hydriodide. The syrup is then dissolved in water and treated with an aqueous solution containing silver nitrate and concentrated nitric acid. After mixing, concentrated hydrochloric acid is added and the precipitated silver halides are removed by filtration. Additional hydrochloric acid then is added and the solution is cooled to 10° C. A cold solution of sodium nitrite is then added and the pH is adjusted to a range of 8–9 by the addition of solid sodium carbonate. This mixture is stirred for a period of time at 10° C., heated to 50° C., and recooled to 10° C. The resulting precipitate is collected by filtration and washed with cold water. Recrystallization of the precipitate from anhydrous ethanol yielded 5-amino-1- phenyltetrazole.

A non-toxic pharmaceutically acceptable organic or inorganic acid addition salt of 5-amino-1-phenyltetrazole may be used in lieu of the 5-amino-1-phenyltetrazole, in the preparation of this invention. For example, the salt derived from acids such as sulfuric, nitric, phosphoric, citric, acetic, lactic, tartaric, sulfamic, succinic, fumaric, maleic, ethanedisulfonic, hydrobromic, benzoic and similar non-toxic acids are suitable in the practice of the invention. These salts are best prepared by reacting the 5-amino-1-phenyltetrazole with a stoichiometric amount of the desired organic or inorganic acid in a suitable solvent such as ethanol, acetone, water or various combinations of solvents.

The 5-amino-1-phenyltetrazole ingredient will be present in amount to produce skeletal muscle relaxation preferably the preparations will contain the active medicament in the amounts calculated to provide daily dosages of from about 50 mg. to about 3,000 mg. and, advantageously, from about 300 mg. to about 2,500 mg.

The pharmaceutical carrier may be, for example, either a solid or a liquid. Exemplary of solid carriers are lactose, magnesium stearate, sucrose, talc, stearic acid, gelatin, agar pectin or acacia. Exemplary of liquid carriers are peanut oil, olive oil, sesame oil and water. Similarly, the carrier or diluent may include a time delay material such as glycerol monostearate or glycerol di-stearate alone or with a wax.

A wide variety of pharmaceutical forms can be employed. Thus if a solid carrier is used the preparation can be tableted, used as a pharmaceutical powder, placed in a hard gelatin capsule, or in the form of a troche or lozenge.

The amount of solid carrier per dosage unit will vary widely but preferably will be from about 25 mg. to about 1 gram. If the liquid carrier is used, the preparation may be in the form of a soft gelatin capsule or a liquid suspension.

In veterinary practice, the preparations can be given as is or as an additive to the food and drink provided the animals.

These preparations can be made by following conventional techniques of mixing, granulating, compressing and dissolving as may be appropriate to the desired end product.

The method of using these materials in accordance with this invention comprises administering internally to animals, includnig man, 5-amino-1-phenyltetrazole or a non-toxic organic or inorganic acid addition salt thereof, preferably combined with a non-toxic pharmaceutical carrier of the type disclosed in an amount to produce skeletal muscle relaxation. The active medicament preferably will be in dosage units in amounts from 50 mg. to about 750 mg., advantageously from about 100 mg. to about 500 mg. The administration may be parenterally or orally, the latter being the preferable route of administration. Advantageously, equal doses will be administered one to four times daily to provide a daily dosage of from about 50 mg. to about 3000 mg. of active medicament, advantageously from about 300 mg. to about 2500 mg. When the administration described above is carried out, skeletal muscle relaxation is produced rapidly and effectively. This method of producing skeletal muscle relaxation is particularly effective when applied to animals, advantageously human beings, having disorders in which skeletal muscle spasm or spasticity is an important symptom.

The following examples are presented to aid in providing a clear understanding of the present invention and of the pharmaceutical compositions therein involved and are not intended in any way to be limiting.

Example I

A mixture of 152 g. (1.0 mole) of phenylthiourea, 142 g. (1.0 mole) of methyl iodide and 1 liter of anhydrous ethanol was refluxed with stirring for 1 hour. The solvent was removed by distillaiton under vacuum, and the residue which crystallized upon standing, was washed with anhydrous ether and dried to yield 274 g. (93% of theory) of 1 - phenyl - S - methylisothiourea hydriodide (M.P. 145–6° C.).

To a suspension of 274 g. (0.93 mole) of 1-phenyl-S-methylisothiourea hydriodide in 750 ml. of anhydrous ethanol was added 34.9 g. (1.0 mole) of 95% anhydrous hydrazine. The mixture was heated gently with stirring until the initial vigorous evolution of methyl mercaptan had subsided. The solution was refluxed with stirring for an additional hour and the solvent was removed by distillation under vacuum. The 1-phenyl-3-aminoguanidine hydriodide, which was obtained as a heavy syrup, weighed 253 g. (98% of theory).

To a solution of 253 g. (0.91 mole) of 1-phenyl-3-aminoguanidine hydriodide in 2 liters of water was added a mixture of 155 g. (0.91 mole) of silver nitrate, 500 ml. of water and 15 ml. of concentrated nitric acid.

After mixing for 5 minutes, 40 ml. of concentrated hydrochloric acid was added. The precipitated silver halides were removed by filtration and washed with 400 ml. of water. The filtration and wash were combined and diluted to approximately 4 liters. An additional 40 ml. of concentrated hydrochloric acid was added, and the solution was cooled to stirring to 10° C. in an ice-bath. A cold solution of 69.0 g. (1.0 mole) of sodium nitrite in 160 ml. of water was added dropwise at a rate to maintain the temperature at 10 to 15° C. When the addition was completed, stirring and cooling were continued for 30 minutes and the pH was adjusted to 8–9 by the addition of solid sodium carbonate. After stirring for an additional hour at 10° C., the mixture was heated to 50° C. and cooled once more to 10° C. The precipitate was collected by filtration, washed with cold water and dried. Recrystallization from anhydrous ethanol yielded 86.5 g. (59% of theory) af 5-amino-1-phenyl-tetrazole, M.P. 161–2° C., dec.

Example II 200 mg. of 5-amino-1-phenyltetrazole, 15 mg. of sorbitol and 85 g. of mannitol were milled to uniform powder and granulated into 6 mg. of gelatin as a 10% solution. The mixture was then screened onto trays and dried at 60° C. The dried granules were sized and mixed with 30 mg. of cornstarch and 4 mg. of magnesium stearate and then compressed into tablets.

Example III

| Ingredients: | Amts., mg. |
|---|---|
| 5-amino-1-phenyltetrazole | 200 |
| Avicel (microcrystalline cellulose) | 150 |
| Polyvinyl pyrrolidone | 5 |
| Magnesium stearate | 4 |

The first three ingredients were mixed to uniformity and lubricated with a portion of the magnesium stearate. The mixture was compressed into slugs, and the slugs were reduced to uniformity and granulated. The powder was then lubricated with the remainder of the magnesium stearate and compressed into tablets.

Example IV

| | Mg. |
|---|---|
| 5-amino-1-phenyltetrazole | 200 |
| Lactose | 175 |
| Magnesium stearate | 5 |

The above ingredients were screened through a #40 U.S. mesh screen or mill to a uniform powder, transferred to a mixer, mixed well and filled into #1 hard gelatin capsule.

Example V

| | Mg. |
|---|---|
| 5-amino-1-phenyltetrazole | 50 |
| Sesame oil | 50 |

The ingredients are mixed into a thick slurry and filled into a soft gelatin capsule.

Example VI

| | Mg. |
|---|---|
| 5-amino-1-phenyltetrazole | 300 |
| Polyethylene glycol 400 | 240 |

The ingredients are mixed into a thick slurry and filled into a soft gelatin capsule.

Example VII

Four tablets providing a total dosage of 800 mg. of 5-amino-1-phenyltetrazole were given orally as a single dose to each of a group of 12 patients having abnormal muscle tone and tension. Electromyographic recordings were obtained from the lower extremity muscles prior to administration of the medicament, and at one hour, two hour, and four hour and six hour intervals after the medicament was taken orally. (Means and variances between the control values and the post-medication data were analyzed statistically.) Variations in muscle spasms, spasticity, and clonus were recorded and measured. A determination was made of percent inhibition of each modality of muscle hyper-reactivity, spasms, spasticity and clonus.

Severity of muscle spasms indicates one aspect of muscle hyper-reactivity. Magnitudes of electrical potentials induced in the leg muscles as a withdrawal response to a cutaneous stimulus were measured and the precent of spasm inhibition, that is, the extent to which the control spasms have been alleviated by the drug at specified intervals are reported below in Table I.

TABLE I.—PERCENT INHIBITION OF MUSCLE SPASMS

| | Tension on Muscle (lbs.) | | | | | Average Inhibition |
|---|---|---|---|---|---|---|
| | 0 | 5 | 10 | 15 | 20 | |
| Percent Inhibition at 1 Hour | 35.4 | 52.5 | 52.6 | 32 | 35.6 | 41.6 |
| Percent Inhibition at 2nd Hour | 55.2 | 57.4 | 55.7 | 36.0 | 39 | 48.7 |
| Percent Inhibition at 4th Hour | 17.1 | 11.8 | 12 | 13.9 | 14.7 | 13.9 |
| Percent Inhibition at 6th Hour | 12.7 | 7.7 | 10 | 6.2 | 8.5 | 9 |
| Percent Inhibition over 4 Hour Period | 35.9 (at 0 lb.) | 40.6 (at 5 lb.) | 40.1 (at 10 lb.) | 27.3 (at 15 lb.) | 29.8 (at 20 lb.) | 34.7 |

The severity of spasticity was determined by recording the magnitude of the electrical potential derived from muscles responding to stretch. Percent inhibition of spasticity, that is the amount of alleviation of control spasticity induced by the medication, is reported in Table II, below.

TABLE II.—PERCENT INHIBITION OF MUSCLE SPACSITITY

| | Tension on Muscle (lbs.) | | | | | Average Inhibition |
|---|---|---|---|---|---|---|
| | 0 | 5 | 10 | 15 | 20 | |
| Percent Inhibition at 1 Hour | 18.8 | 8 | 9.7 | 17.7 | 29.9 | 16.8 |
| Percent Inhibition at 2nd Hour | 27 | 28.3 | 30.1 | 37.3 | 44.8 | 33.5 |
| Percent Inhibition at 4th Hour | 21.1 | 25.6 | 24.4 | 29.8 | 34.4 | 27.1 |
| Percent Inhibition at 6th Hour | 11.7 | 15.4 | 16.9 | 17.8 | 20.7 | 16.5 |
| Percent Inhibition over 4 Hour Period | 22.3 (at 0 lb.) | 20.6 (at 5 lb.) | 21.4 (at 10 bl.) | 28.3 (at 15 lb.) | 36.4 (at 20 lb.) | 25.8 |

Severity of ankle clonus expresses the degree of muscle hyper-reactivity to repetitive stretching of the gastrocnemius muscles. Percent inhibition, reported in Table III, below, indicates the central and peripheral action of the medication.

TABLE III.—PERCENT INHIBITION OF MUSCLE CLONUS

| | Tension on Muscle (lbs.) | | | | | Average Inhibition |
|---|---|---|---|---|---|---|
| | 0 | 5 | 10 | 15 | 20 | |
| Percent Inhibition at 1 Hour | | | | 76 | 82 | 79 |
| Percent Inhibition at 2nd Hour | | | | 100 | 100 | 100 |
| Percent Inhibition at 4th Hour | | | | 53 | 47.5 | 50.2 |
| Percent Inhibition at 6th Hour | | | | 27 | 24.5 | 25.8 |
| Percent Inhibition over 4 Hour Period | | | | 76.3 | 76.7 | 76.3 |

These studies show that these preparations effectively produced and maintained the inhibition of muscle spasms at good levels for four hours (34.7% inhibition) and at significant levels for six hours. The duration of activity of the compound is a very favorable feature. The preparations exhibited muscle relaxant properties which are helpful in the relief of muscle spasms which are triggered by peripheral mechanisms, such as those associated with ruptured discs, whip-lash injuries of the neck, muscle strains, other acute traumatic injuries, lumbago, low back pain, fibrositus, acute strains, bursitis and other such painful disorders in which acute muscle spasm is a prominent feature.

The preparations also possess properties useful for the reduction of muscle stiffness in patients with central nervous system disorders. The relief of spasticity induced by the preparations was at practical clinical levels (25.8% inhibition) over a four hour period and at a significant level (16.5%) at the sixth hour.

The preparation's quality to significantly reduce clonus (76.3% inhibition over a four hour period and 24.5% inhibition at the sixth hour) indicates a useful combination of central and peripheral action. These features are particularly valuable for patients with spasticity of central nervous system origin who have intermittent muscle spasms of peripheral origin superimposed upon underlying muscle stiffness.

Clinical benefits were derived in patients with spasticity-spasms for periods up to 24 hours after a single oral dose of 5-amino-1-phenyltetrazole in both the severity and the ammount of "spontaneous" spasms in the patient with spasticity.

From the foregoing description and examples, it becomes apparent that new muscle relaxant preparations and methods of producing skeletal muscle relaxation therewith have been herein described, which fulfill the aforestated objectives to a remarkably unexpected degree. It is of course understood that the several examples herein disclosed are for illustrative purposes only and that such alterations, modifications and applications as readily occur to the artisan are intended within the spirit of this invention, especially as it is defined by the scope of the claims appended hereto.

Accordingly, we claim:

1. A pharmaceutical preparation in dosage unit form and having muscle relaxant activity, comprising a pharmaceutical carrier and from about 50 to about 3,000 mg. of a member selected from the group consisting of 5-amino-1-phenyltetrazole and its non-toxic pharmaceutically acceptable acid addition salts, said dosage unit form being selected from the group consisting of tablets, capsules, powders and sterile parenteral liquids.

2. A method of producing muscle relaxation which comprises internally administering to a human or an animal afflicted with muscle spasm a compound selected from the group consisting of 5-amino-1-phenyltetrazole and its non-toxic pharmaceutically acceptable acid addition salts in an amount sufficient to produce muscle relaxation.

3. The method of claim 2 in which the administration is orally to human beings afflicted with muscle spasm.

4. A method of producing muscle relaxation which ccomprises internally administering to a human or an animal afflicted with muscle spasm a daily dosage of about 50 mg. to about 3,000 mg. of a compound selected from the group consisting of 5-amino-1-phenyltetrazole and its non-toxic pharmaceutically acceptable acid addition salts.

5. The method of claim 4 in which the administration is orally to human being afflicted with muscle spasm.

6. A method of producing muscle relaxation which comprises orally administering to a human or an animal afflicted with muscle spasm a daily dosage regimen of about 300 mg. to about 2,500 mg. of a compound selected from the group consisting of 5-amino-1-phenyltetrazole and its non-toxic pharmaceutically acceptable acid addition salts.

7. The method of claim 6 in which the administration is orally to human beings affllicted with muscle spasm.

References Cited by the Examiner

Journal of Organic Chemistry, January 1951, "Synthesis of 5-Aminotetrazole Derivatives," R. Herbst et al., pp. 139–149.

JULIAN S. LEVITT, *Primary Examiner.*

MARTIN J. COHEN, *Assistant Examiner.*